United States Patent [19]

Schadowski et al.

[11] 4,239,150
[45] Dec. 16, 1980

[54] FOLDING CARTONS FOR LIQUIDS

[75] Inventors: Werner Schadowski, Linnich; Heinrich Bellut, Myhl, both of Fed. Rep. of Germany

[73] Assignee: PKL Papier- und Kunststoff Werke, Dusseldorf, Fed. Rep. of Germany

[21] Appl. No.: 960,537

[22] Filed: Dec. 4, 1978

[30] Foreign Application Priority Data

Nov. 14, 1977 [DE] Fed. Rep. of Germany ....... 2750901

[51] Int. Cl.³ .............................................. B65D 5/42
[52] U.S. Cl. ................................. 229/48 R; 229/48 T
[58] Field of Search .......................... 229/48 R, 48 T; 206/830, 627

[56] References Cited

U.S. PATENT DOCUMENTS

| 2,333,330 | 11/1943 | Moore | 229/48 R X |
|---|---|---|---|
| 2,550,520 | 4/1951 | Bennett | 229/48 R |
| 3,092,248 | 6/1963 | Lane et al. | 229/48 R X |
| 3,093,287 | 6/1963 | Stark | 229/48 R X |
| 3,099,378 | 7/1963 | Schroeder | 229/48 R X |
| 3,307,738 | 3/1967 | Scheindel | 229/48 T X |
| 3,495,507 | 2/1970 | Haas et al. | 229/48 T UX |
| 3,604,613 | 9/1971 | Haas et al. | 229/48 T X |
| 3,942,708 | 3/1976 | Christensson | 229/48 T X |

*Primary Examiner*—Davis T. Moorhead
*Attorney, Agent, or Firm*—Sprung, Felfe, Horn, Lynch & Kramer

[57] ABSTRACT

In a carton for liquids folded from a sheet of packaging material wherein the carton has a lapped seam with a protected edge, the improvement which comprises providing the protected edge with a wedge-like tapered profile, whereby the thickness of the sheet material is reduced along the protected edge. The sheet material carries a thicker protective coating on the inside of the carton and a thinner coating on the outside. The seams are lapped by various configurations of the wedge, depending upon which face is undercut.

6 Claims, 6 Drawing Figures

FOLDING CARTONS FOR LIQUIDS

The invention relates to a folding carton for liquids where the carton, folded from a sheet of packaging material, has a lap seam with a protected edge and the thickness of the packaging-material sheet is reduced along the protected edge.

The protected edge is regarded as necessary in the case of seams of containers for liquids made of a composite material, such as a plastic-coated fibrous material, in order that the edge of the fibrous material may not come in contact with the liquid. For this purpose, the edge with the plastic coating is folded back outwardly. The problem with this is that the thickness of the material along the edge then is doubled; and when seams cross there may be a fourfold material thickness. Such thicknesses of the material are undesirable since they make fabrication more difficult and may cause leaks. For this reason, the practice has been to remove material stepwise along the edge and reduce the thickness to half, for example, so that when the edge is folded back outwardly the folded-back portion of the edge has the normal, initial thickness of the material. Removal of the material is by milling.

The present invention has as its object to provide a folding carton for liquids in which the protected edge is formed in a particularly simple manner and high liquid tightness is achieved even when the lap seam is of but slight thickness.

In accordance with the invention, this object is accomplished in that the protected edge in section has a profile tapered in the manner of a wedge. The protected edge may have a wedge-like linear taper of 45° or less, for example. Preferably the wedge surface initially has a more pronounced taper and then extends more nearly flat as far as the tip of the wedge. The tip of the wedge preferably has a thickness of from 20 to 60$\mu$. For the more pronounced taper, it is preferable that the thickness of the packaging-material sheet be reduced by more than 50% over one-third of the length of the wedge. Preferably the initial thickness of the material is reduced for the more pronounced taper by 55 to 70% over one-third to one-half of the length of the wedge. The remaining flatter portion of the length of the wedge then gradually thins out into the tip of the wedge with the minimum thickness indicated. It has been found that particularly in the case of plastic-coated packaging material said wedge profile results in advantages since the thicker portion of the wedge provides a high degree of stiffness while the flattened portion thinning out into the wedge tip lends itself particularly well to a folding back of said tip for formation of the protected edge.

The advantages of the liquid-tight folding carton with a protected edge proposed in accordance with the invention are apparent particularly in the case of liquid-tight packaging materials consisting of a composite material where the folding carton as a rule has a thicker coating on the side which is in contact with the liquid and a thinner coating on the side not in contact with the liquid. The principal material in the middle may be a fibrous material, for example, paperboard having a weight of from 200 to 300 g/cm$^2$ (corresponding to a thickness of 300 to 450$\mu$), while on the side in contact with the liquid a thick plastic coating of from 20 to 60$\mu$ and on the side not in contact with the liquid a plastic coating from 10 to 20$\mu$ thick is provided. Polyethylene (PE) in particular has come into use as a plastic coating. However, other customary plastic coatings may be used as well as combinations with plastic foil or aluminum foil. In place of the fibrous material in the middle a foamed plastic or an unsupported plastic may be provided. It is particularly advantageous when in such a liquid-tight folding carton the tip of the wedge is formed by the thicker coating and when of the wedge surface at least the tip of the wedge is folded back outwardly, and when with and along the folded-back surface of the underlapping portion the thicker coating of the overlapping portion of the packaging-material sheet is sealed. At its tip, the wedge then has at least the thickness of the thicker coating, in other words, from 20 to 60$\mu$. It has been found advantageous to fold back at least one-third of the length of the wedge surface, both to form the protected edge and to secure good sealing of the underlapping portion to the overlapping portion. The overlapping portion should cover with its thicker plastic coating at least the folded-back portion of the protected edge, and preferably the entire wedge-like tapered part of the underlapping portion. In heat-sealing, the thicker plastic coating then becomes welded to the wedge surface, which makes for a very good joint. In many cases it may be advantageous if the thicker plastic coating of the overlapping portion in sealing extends as far as the thinner plastic coating of the underlapping portion so that the region directly behind the wedge-like taper is also covered, which results in a very good closure.

The wedge-like tapered profile alternatively makes it possible to form a liquid-tight carton with a very thin lap seam in that both the overlapping portion and the underlapping portion have the wedge-like tapered profile and the two portions are joined together along the wedge surface. This joint may be formed by a bonded seam or a sealed seam. In this embodiment, the two wedge surfaces may taper in the same direction, that is to say, the wedge surface thins out in both cases toward the thicker coating, in which case a sealed seam is indicated for the seam along the wedge surfaces. If the edges taper off in opposite directions, that is to say, if the profile toward the tip of the wedge tapers toward the thicker coating in one part and toward the thinner coating in the other part, a bonded seam will be appropriate. In the latter embodiment, the various layers of the composite material abut by their identical material thicknesses, the thick plastic coating in contact with the liquid being heat-sealed. This embodiment is particularly well suited for the areas of a folding carton where the seam is intersected, as in this embodiment the original thickness of the material is preserved. Here, however, there is not quite as much assurance of tightness as with the thicker lap described above.

The wedge-like tapered profile is appropriately produced by paring the edge with a knife. Particularly well suited for production of the wedge surface tapered in accordance with the invention is a hollow knife rotating with a peripheral speed of over 10 m/sec, against which the continuously advancing packaging-material sheet is pressed by means of compressed air. This construction provides assurance that a readily sealable or bondable interface is obtained without the sealing process being jeopardized by dust particles. It has the further advantage that in the case of containers for liquids such as milk the milk is not contaminated by dust.

The invention is described below in greater detail in terms of an exemplified embodiment shown in the drawing, where:

Figure 1:
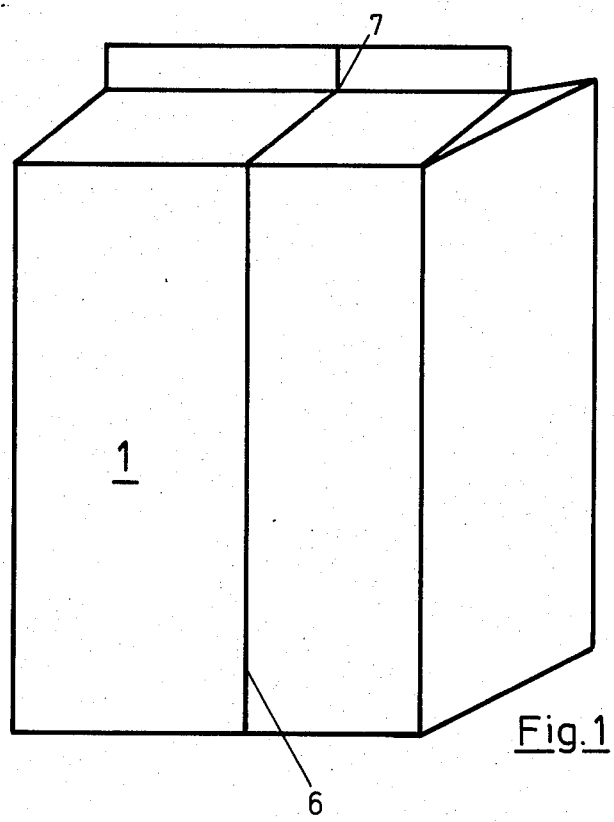
FIG. 1 is a diagrammatic representation of a folding carton with a lap seam.

The liquid-tight folding carton, for example, a folding carton for milk, designated overall by 1 is fabricated from a composite material (FIG. 2) which in the middle has a paperboard layer 2 430μ thick, on the side in contact with the liquid a thicker plastic layer 4 (40μ polyethylene), and on the side not in contact with the liquid a thinner plastic layer 5 (15μ polyethylene). By folding the packaging-material sheet, lap seams 6 are formed on the folding carton 1. Said lap seams may cross at intersections 7.

Figure 2:
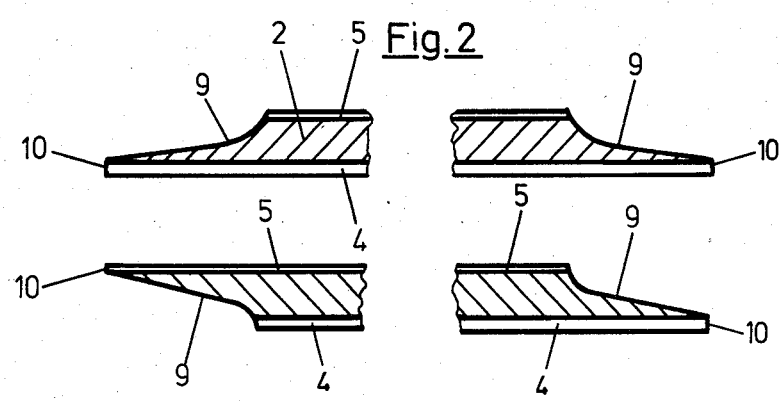
FIG. 2 shows two examples of a particularly preferred profile on an enlarged scale.

FIG. 2 shows, for two different embodiments, the profile of the wedge surface 9 with different tapers toward the tip 10 of the wedge. Over the first third of the length of the wedge, the thickness is reduced by more than 55% of the total thickness while the wedge tapers off at a slower rate and more gradually toward its tip 10. In the upper part of FIG. 2 the wedge profile on the two portions of the packaging-material sheet shown is equidirectional, permitting a lap seam such as the one shown in FIG. 3 to be formed. In the lower part of FIG. 2, the wedge profile 9 in one case (left half of the figure) tapers off into the wedge tip 10 toward the thinner layer 5 and in the other case (right half of the figure) toward the thicker layer 4. This embodiment lends itself to the formation of the lap seam shown in FIG. 5.

As shown in detail in FIGS. 3 to 6, the folding carton 1 has a protected edge 8 at the lap seams 6. This protected edge 8 is necessary in order that the liquid may not come in contact with the front end of the packaging-material sheet. The protected edge 8 is based on the tapered wedge profile shown in connection with FIG. 2, the thickness of the tip 10 of the wedge being approximately equal to the thickness of the thicker plastic layer 4 (for example, 40μ).

Figure 3:
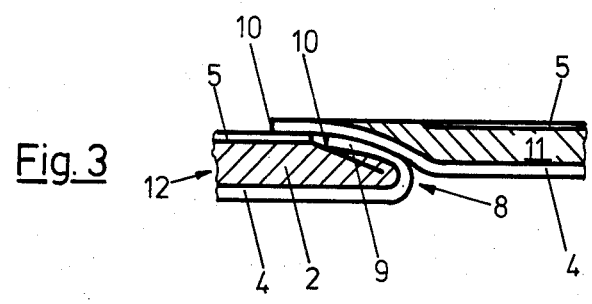
FIGS. 3 and 4 show examples of a sealed lap seam with the subject matter of FIG. 2.

In accordance with the embodiment shown in FIG. 3, the protected edge 8 is formed by folding back the wedge surface 9 of the underlapping portion 12 approximately at its center so that the folded-back wedge tip 10 abuts on the thinner plastic layer 5 of the underlapping portion 12. The thicker plastic layer 4 of the overlapping portion 11 abuts against the folded-back thicker plastic layer 4 of the underlapping portion 12, with the front edge 10 of the overlapping portion 11 extending over the thinner plastic layer 5 of the underlapping portion 12 so that the protected edge 8 is completely covered by the thicker plastic layer 4 of the overlapping portion 11. In this embodiment, sealing (a sealed seam) will provide a good joint, though at the expense of a slight enlargement.

Figure 4:
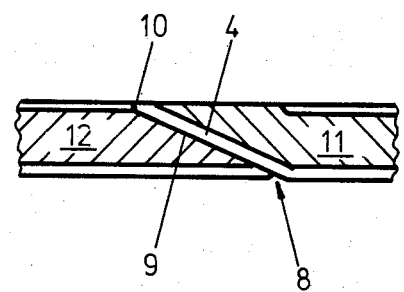
Figure 5:
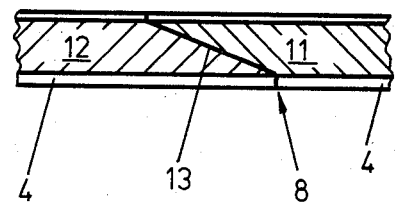
FIG. 5 shows an example of a bonded lap seam.

In the embodiment in accordance with FIGS. 4 and 5, there is practically no enlargement about the lap seam since the overlapping portion 11 passes nearly seamless into the underlapping portion 12. In the embodiment according to FIG. 4, the front edge 10 of the overlapping portion 11 terminates at the level of the thin plastic layer 5 of the underlapping portion 12. In the embodiment in accordance with FIG. 4, there is no folding back; the protected edge 8 is obtained solely by sealing the plastic layer 4 of the overlapping portion 11 to the wedge surface 9 of the underlapping portion 12, the absence of dust on the wedge profile produced by paring being a prime requirement for a satisfactory seal. In the embodiment according to FIG. 5, the interface between the overlapping portion 12 and the underlapping portion 11 is a bonded seam 13. The abutting thicker layers 4 of the underlapping portion 12 and of the overlapping portion 11 are fused by the action of heat.

Figure 6:
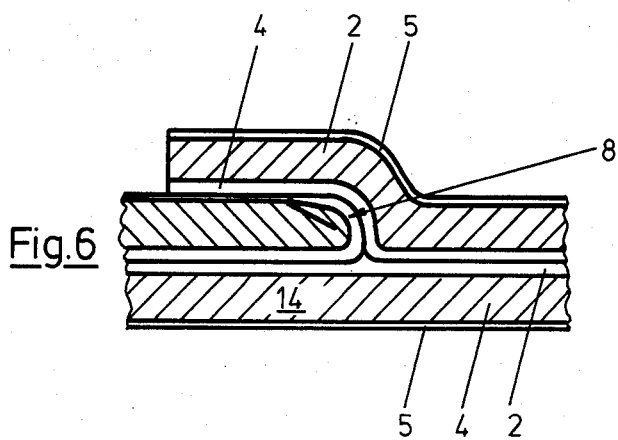
FIG. 6 shows an example of intersecting seams.

Particularly advantageous is also the intersection of a longitudinal seam and a transverse seam shown in FIG. 6. The upper part of the figure corresponds to the representation in accordance with FIG. 3. In the lower part there is a further layer 14 of the composite material comprising the paperboard layer 2, the thicker plastic layer 4 and the thinner plastic layer 5.

Providing a wedge surface both on the underlapping portion 12 and on the overlapping portion 11 is indicated when thick profiles are processed, as in this way a lap seam is obtained which overall is thinner.

It will be appreciated that the instant specification and claims are set forth by way of illustration and not limitations and that various changes and modifications may be made thereto without departing from the spirit and scope of the present invention.

What is claimed is:

1. In a carton for liquids folded from a sheet of packaging material wherein the carton has a lapped seam with a protected edge, the improvement which comprises providing the protected edge with a wedge-like tapered profile, wherein the taper is relatively more pronounced adjacent where it joins the rest of the sheet material and is relatively less pronounced therebeyond toward its tip, whereby the thickness of the sheet material is reduced along the protected edge.

2. In a carton for liquids folded from a sheet of packaging material wherein the carton has a lapped seam with a protected edge, the improvement which comprises providing the protected edge with a wedge-like tapered profile, wherein the sheet material on the inside has a relatively thicker protective coating and on the outside has a relatively thinner protective coating, whereby the thickness of the sheet material is reduced along the protected edge.

3. A carton according to claim 2, wherein one edge forming the seam is undercut on the thinner coating side, that wedge being folded back upon itself so that the thicker coating surrounds the fold-back for contact with the other portion making up the seam.

4. A carton according to claim 3, wherein both edges forming the seam are undercut on the thinner coating side, the seam being formed by folding one wedge back upon itself so that the thicker coating surrounds the fold-back and contacts the thicker coating on the inside of the complementary wedge forming the seam.

5. A carton according to claim 2, wherein the seam is made up of two lapping wedges each undercut on the thinner coating side, the wedges being joined into a substantially flat seam by the thicker coating on one of the wedges.

6. A carton according to claim 2, wherein the seam is made up of two lapping wedges one undercut on the thinner coating side and the other undercut on the thicker coating side, the wedges being joined into a substantially flat seam.

* * * * *